(No Model.)
C. R. ARNOLD.
ELECTRIC METAL WORKING.
No. 489,114. Patented Jan. 3, 1893.
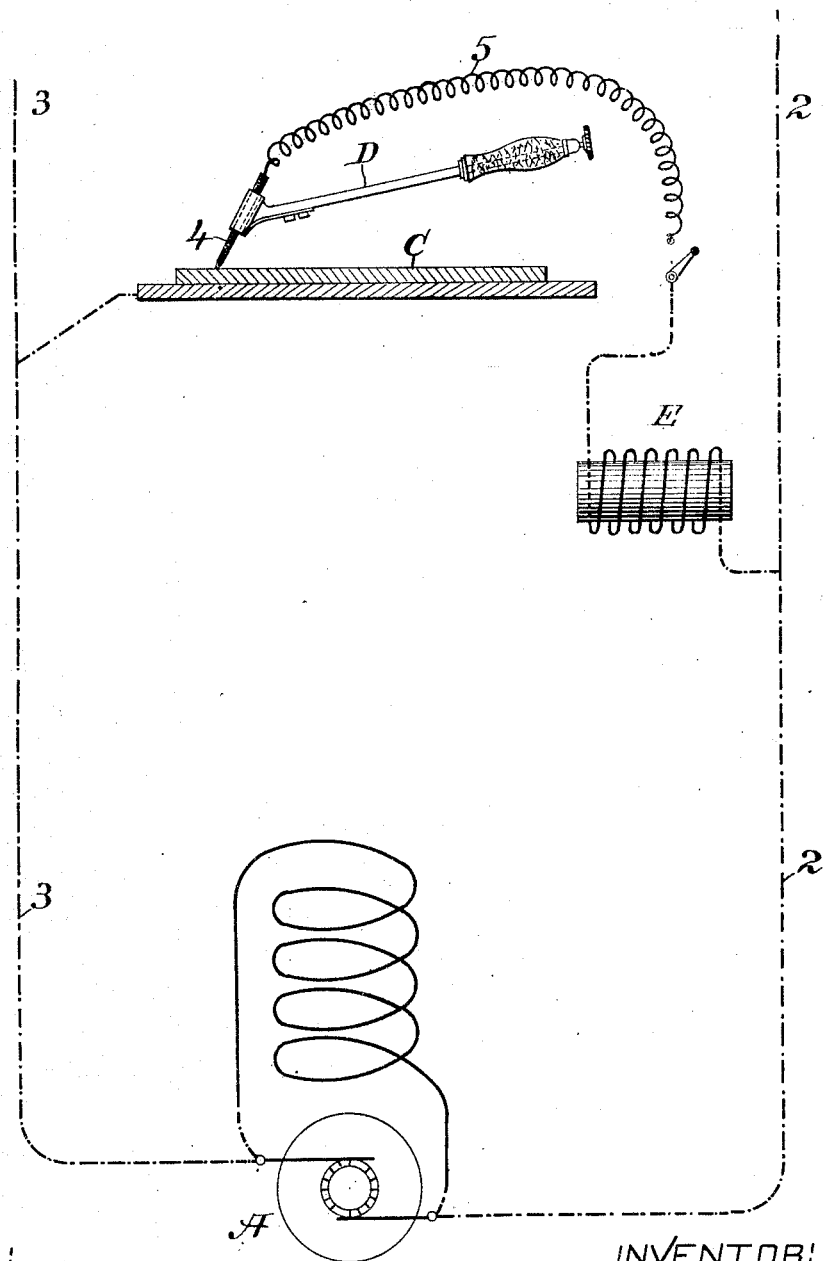
ATTEST:
J. Hurdle
T. F. Convey
INVENTOR:
Craig R. Arnold
By H. C. Townsend
Attorney

UNITED STATES PATENT OFFICE.

CRAIG R. ARNOLD, OF SHARON HILL, PENNSYLVANIA.

ELECTRIC METAL-WORKING.

SPECIFICATION forming part of Letters Patent No. 489,114, dated January 3, 1893.

Application filed May 17, 1892. Serial No. 433,316. (No model.)

*To all whom it may concern:*

Be it known that I, CRAIG R. ARNOLD, a citizen of the United States, and a resident of Sharon Hill, in the county of Delaware and State of Pennsylvania, have invented a certain new and useful Improvement in Electric Metal-Working, of which the following is a specification.

My invention relates to those metal working operations in which an electric arc is employed for melting or softening the metal, and is primarily designed for use in the welding of metals of any kind.

My invention is of great utility in the welding or joining of plates or pieces of lead together by a directly applied electric arc.

I have hereinafter described my invention as carried out in connection with that process of arc welding which consists in making the pieces of metal to be joined one pole of the electric circuit and forming the arc by touching the metal with a conductor consisting preferably of a piece of carbon and then removing it slightly to cause an arc to play upon the metal which is to be welded or softened, but it will be at the same time understood that the invention is not limited to such special method of forming the arc at the surfaces to be heated, other ways being known in the art.

Briefly speaking my invention may be defined as consisting in the use of an induced or extra current in the circuit in which the current forming the arc flows for the purpose to be hereinafter described, such induced or extra current serving at one time to oppose the current from the main source employed and at another time to assist or flow with a polarity to assist that current. I prefer to generate this extra or induced current through the action of a self-inductive or reactive coil interposed between the generator and the work, but do not limit myself to such a device thus interposed in the circuit.

In the accompanying drawing I have illustrated in general diagrammatical fashion one form of apparatus for practicing my invention.

In arc welding or metal working both when the work forms one pole of the generator and a separate tool or electrode the other and when the two parts of the work form respectively the opposite poles, it is well known that if potential enough be applied to establish and maintain a full arc, but without the interposition of some sort of resistance, a dead short circuit would be established at the moment of contact which is made preliminarily to the formation of the arc and there would result blowing of fuses or of the disturbing and objectionable effects of short circuiting the generator. Either of two plans might be adopted for carrying on the process without producing such objectionable effects the first of which would be to use a low potential and a high current strength, the second to cut down the high potential by ordinary resistance. I have found by experimenting in welding lead, for instance, that when these plans are employed a current of approximately forty ampères in strength is required. Under these conditions lead, for instance, will oxidize more or less rapidly and the arc be accompanied by a series of explosions of greater or less magnitude.

In the preferred manner of carrying out my invention, I propose to dispense with the use of any resistance coil or other device operating simply as a dead resistance and to interpose in the circuit a self-inductive or reactive coil such as would be formed by any ordinary electro-magnet whose coils are included in the circuit, such device being operated in any circuit of higher or lower potential by properly proportioning the inductive resistance coil to the potential. The coil thus interposed in circuit produces two effects, the first of which reduces the potential at the instant of completing or forming the circuit preliminarily to the production of the arc, thereby preventing any ill effects from a dead short circuit which would be produced by the positive contact of the tool on the object. The second effect (which follows on the breaking of contact to establish the arc), is that obtained by the extra current on breakage of circuit and which is an induced current assisting the main or normal electro-motive force of the source. This induced current carries with it an electric flame or atmosphere which is less oxidizing in its effect than a direct current would be.

It is possible to obtain results with five ampères by this method representing about fivesevenths of a horsepower on a one hundred and ten volt circuit which would require without the induced arc six horsepower.

In the use of the apparatus the arc is alternately formed and broken by establishing contact or circuit in the work and then forming the arc and causing it to cease in any proper manner either by lengthening it beyond the power of the main generator to maintain or by otherwise breaking the circuit and then repeating the operation.

In the drawing the generator is typified at A, as an ordinary shunt wound dynamo, but might be any other source of current. The machine shown is supposed to be adapted to supply or maintain upon the mains or wires 2, 3, an approximately constant potential, say of one hundred and ten volts.

C, indicates the work; D, the tool comprising a suitable insulating handle supporting the electrode 4, which may be a stick of carbon, as well understood in the art, said stick of carbon being connected by a flexible conductor 5, or otherwise, with one of the mains 2, while the work C, is connected with the other main.

E, is an electro-magnet the coils of which are in the circuit of the work, as shown, in the branch or circuit connecting the mains or wires 2, 3, which are supplied with energy from the dynamo or other source. Either one or more electro-magnets might be employed and said magnets may be of any desired form best adapted to permit the coil to operate as a reactive or self-inductive coil whereby the extra or induced current will be established at the moment of formation of the circuit and when the circuit is broken in forming the arc. I do not limit myself, however, to setting up this induced assisting and opposing force to oppose the current at the time of short circuiting and to assist the current as the arc is formed by this special means since the same advantageous results can be obtained by generating the proper electro-motive force by any other means provided it is developed at the times and in the direction described.

What I claim as my invention is:—

1. The herein described improvement in metal working by the electric arc, consisting in setting up an extra or induced current in the circuit of the arc, as and for the purpose described.

2. The herein described improvement in electric metal working by the electric arc, consisting in opposing the current of the main source by a counter electro-motive force at the instant of completing the circuit through the work, as and for the purpose described.

3. The herein described improvement in electric metal working by the electric arc, consisting in assisting the electro-motive force of the main source employed for providing the heating arc by an induced current generated in the circuit thereof in any desired manner, as and for the purpose described.

4. The herein described improvement in electric metal working by the electric arc, consisting in generating in the circuit between the source and the work an extra current both at the instant of the completion of circuit just before the formation of the arc and also accompanying the formation of the arc.

5. In an electric metal working apparatus, the combination with the generator which supplies the arc forming current and the work, of one or more self-inductive or reactive coils interposed between the generator and the work, as and for the purpose described.

6. In an electric metal working apparatus, the combination, substantially as described, with mains or wires having an approximately constant maintained potential, of a connection from the latter to the arc forming electrode, and a self-inductive reactive coil or coils interposed in such connection, as and for the purpose described.

Signed at Chester, in the county of Delaware and State of Pennsylvania, this 16th day of May, A. D. 1892.

CRAIG R. ARNOLD.

Witnesses:
 H. WALTER ZOOK,
 J. LENTZ GARRETT.